United States Patent
Shim et al.

(10) Patent No.: US 10,279,776 B2
(45) Date of Patent: May 7, 2019

(54) MOBILE TERMINAL AND METHOD FOR CONTROLLING THE SAME

(71) Applicant: LG ELECTRONICS INC., Seoul (KR)

(72) Inventors: Soomin Shim, Seoul (KR); Sungil Cho, Seoul (KR); Kuznetsov Vassily, St. Petersburg (RU); Dongkyu Lee, Seoul (KR); Hyeoncheol Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 15/366,960

(22) Filed: Dec. 1, 2016

(65) Prior Publication Data
US 2018/0050661 A1 Feb. 22, 2018

(30) Foreign Application Priority Data
Aug. 18, 2016 (KR) .................. 10-2016-0104965

(51) Int. Cl.
| | |
|---|---|
| *B60K 35/00* | (2006.01) |
| *B60K 37/06* | (2006.01) |
| *B60R 25/20* | (2013.01) |
| *B60R 25/25* | (2013.01) |

(52) U.S. Cl.
CPC .......... *B60R 25/2081* (2013.01); *B60K 35/00* (2013.01); *B60K 37/06* (2013.01); *B60R 25/252* (2013.01); *B60K 2350/1028* (2013.01); *B60K 2350/1056* (2013.01); *B60K 2350/357* (2013.01)

(58) Field of Classification Search
None
See application file for complete search history.

(56) References Cited

U.S. PATENT DOCUMENTS

| | | | |
|---|---|---|---|
| 9,118,750 B2* | 8/2015 | Vossoughi | B60R 11/02 |
| 9,505,413 B2* | 11/2016 | Laine | G08G 1/165 |
| 9,949,064 B2* | 4/2018 | Ko | H04W 4/80 |
| 2002/0105411 A1 | 8/2002 | Maeda et al. | |
| 2010/0156676 A1* | 6/2010 | Mooring | G06F 1/163 |
| | | | 341/20 |
| 2014/0143784 A1* | 5/2014 | Mistry | G06F 15/0208 |
| | | | 718/102 |
| 2015/0156898 A1* | 6/2015 | Shin | H04M 1/0256 |
| | | | 361/679.02 |
| 2016/0063777 A1 | 3/2016 | Wooley | |
| 2016/0073073 A1* | 3/2016 | Ha | H04B 1/3888 |
| | | | 345/156 |
| 2017/0151918 A1* | 6/2017 | Boesen | A61B 5/117 |
| 2018/0072267 A1* | 3/2018 | Shim | A61B 5/6831 |

FOREIGN PATENT DOCUMENTS

| | | |
|---|---|---|
| JP | 2010-77603 A | 4/2010 |
| KR | 10-2005-0045395 A | 5/2005 |
| KR | 10-2016-0086183 A | 7/2016 |

* cited by examiner

*Primary Examiner* — Carlos Garcia
(74) *Attorney, Agent, or Firm* — Birch, Stewart, Kolasch & Birch, LLP

(57) ABSTRACT

A mobile terminal for controlling a vehicle can include a wearable wrist band, a first body connected to the wearable wrist band, a second body including an input unit and configured to be detachably mounted to the first body, and a controller in the second body that executes a first function based on the second body being attached to the first body, and executes a second function based on the second body being separated from the first body.

19 Claims, 14 Drawing Sheets

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0104965, filed on in the Republic of Korea on Aug. 18, 2016, the contents of which are incorporated by reference herein in its entirety.

BACKGROUND OF THE INVENTION

Field of the Invention

This specification relates to a wearable wrist mobile terminal, and a method for controlling the same.

Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

Recently, a vehicle is provided with a remote keyless entry (RKE) function to open and close doors. The RKE function refers to a function for a driver to open and close doors of a vehicle, by using a lock button or an unlock button.

Occasionally, a driver may carry baggage with both hands, hold a baby, etc. In this type of situation, it is difficult for the driver to press the lock button or the unlock button in order to execute the RKE function.

Accordingly, techniques to control a vehicle using a mobile terminal are being actively developed.

SUMMARY OF THE INVENTION

Therefore, an aspect of the detailed description is to provide a mobile terminal having a body formed such that part thereof is separable.

Another aspect of the detailed description is to provide a mobile terminal capable of controlling an external device in an optimized manner using a separated body, and a method for controlling the same.

To achieve these and other advantages and in accordance with the purpose of this specification, as embodied and broadly described herein, there is provided a mobile terminal, including: a band formed to be wearable on a user's wrist and to enclose the user's wrist; a first body connected to the band; a second body formed to be detachably mounted to the first body; and a processor provided at the second body, and configured to sense a separated state of the second body from the first body, and if the separated second body is mounted to an external device, the processor executes a different function based on a type of the external device.

In an embodiment, if the external device is a first device, the second body may execute a first function related to the first device. And if the external device is a second device different from the first device, the second body can execute a second function related to the second device.

In an embodiment, the first and second functions can be different from each other.

In an embodiment, the external device can be a vehicle, and the processor may execute a different function according to a mounting position of the second body to the vehicle.

In an embodiment, if the second body is mounted to a first module of the vehicle, the processor may execute a function related to the first module. And if the second body is mounted to a second module of the vehicle, the processor can execute a function related to the second module.

In an embodiment, the second body can be provided with a fingerprint recognition sensor, and the processor can differently set a control right with respect to the vehicle, according to whether a fingerprint authentication is successful or not after the second body is mounted to one module of the vehicle.

In an embodiment, the second body may be provided with a display unit. And if the second body is mounted to one module of the vehicle, the processor can output information about the vehicle to the display unit.

In an embodiment, different screen information can be output to the display unit according to a state of the vehicle.

In an embodiment, the second body can be provided with a sensing unit, and the processor can sense different data according to a mounting position of the second body to the vehicle.

In an embodiment, the processor may set a different control right according to whether the external device to which the second body has been mounted is a pre-authenticated device.

In an embodiment, the second body can include an FOB module configured to control the external device, and a display unit formed to be detachably mounted to the FOB module. The display unit separated from the FOB module can control the external device. And a control right of the display unit can be changed according to whether the display unit is connected to the FOB module.

In an embodiment, if the display unit is separated from the FOB module, the processor can control the display unit based on an input applied to the FOB module.

In an embodiment, the FOB module can be provided with an input/output unit, and the input/output unit of the FOB module can be activated when the display unit is separated from the FOB module.

To achieve these and other advantages and in accordance with the purpose of this specification, as embodied and broadly described herein, there is also provided a method of controlling a mobile terminal, the method including: sensing a separated state of a second body from a first body; and when the separated second body is attached to an external device, executing a different function based on a type of the external device.

In an embodiment, if the external device is a first device, the second body can execute a first function related to the first device. And if the external device is a second device different from the first device, the second body can execute a second function related to the second device.

In an embodiment, the external device can be a vehicle, and in the executing, a different function can be executed according to a mounting position of the second body to the vehicle.

In an embodiment, the second body can be provided with a fingerprint recognition sensor. And in the executing, control rights can be set differently with respect to the vehicle according to whether a fingerprint authentication is successful or not, after the second body is mounted to one module of the vehicle.

In an embodiment, the second body can be provided with a sensing unit. And in the executing, different data can be sensed according to a mounting position of the second body to the vehicle.

In an embodiment, in the executing, different control rights can be set according to whether the external device to which the second body has been mounted is a pre-authenticated device.

In an embodiment, the second body can include an FOB module configured to control the external device, and a display unit that can be detachably mounted to the FOB module. The display unit separated from the FOB module can control the external device. And control rights of the display unit can be changed according to whether the display unit is connected to the FOB module.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
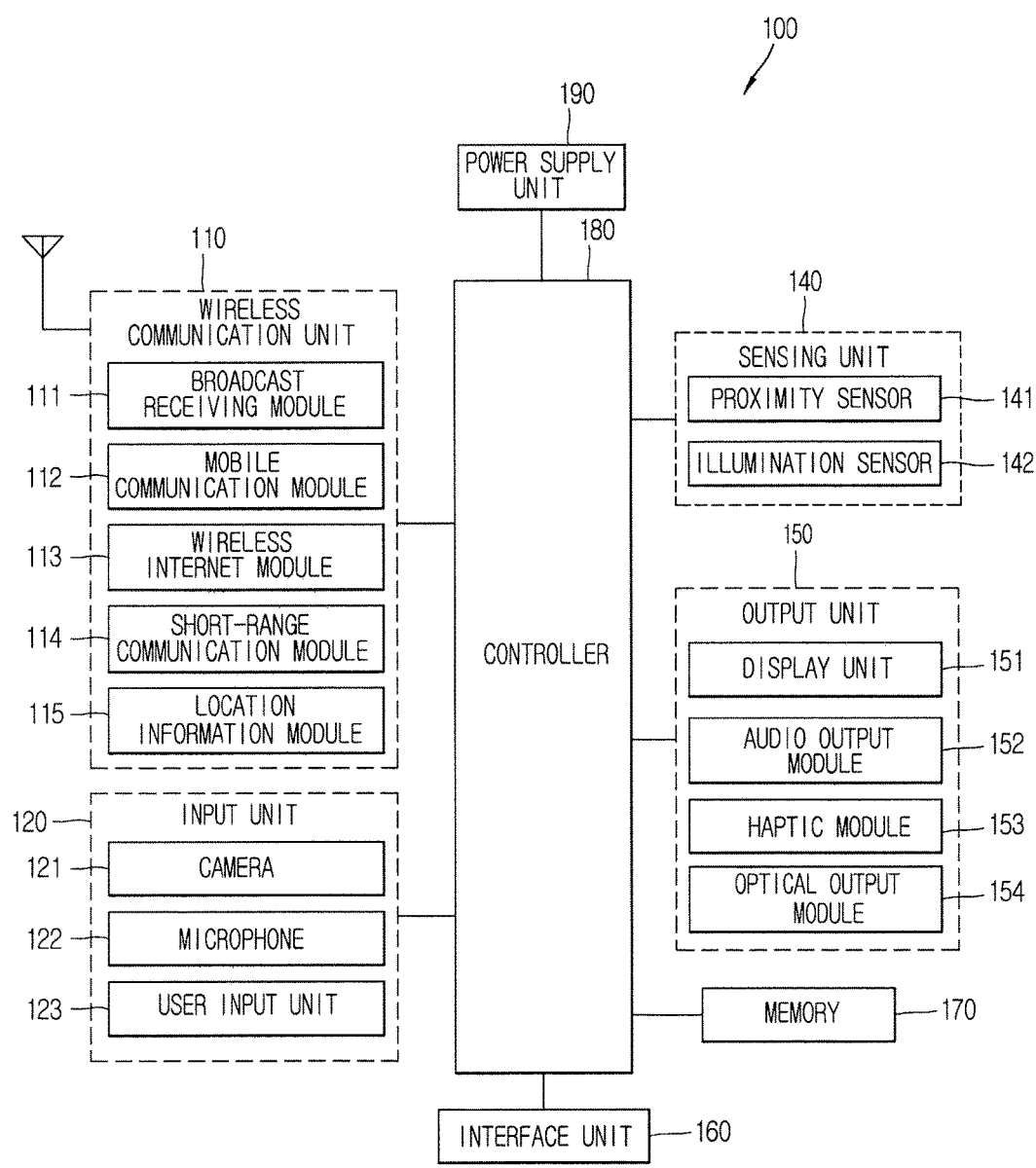
FIG. 1A is a block diagram illustrating a mobile terminal according to an embodiment of the present invention.
Figure 1B:
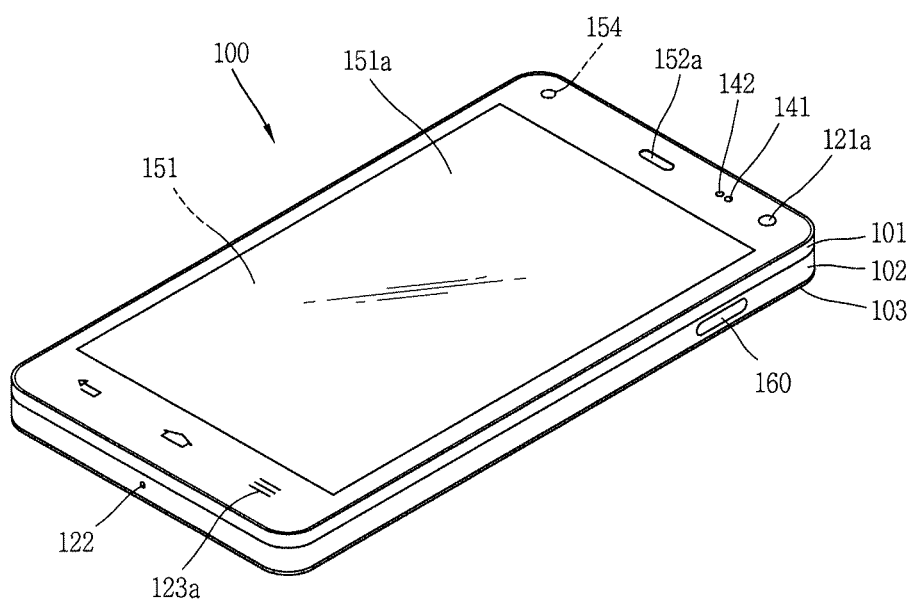
FIGS. 1B and 1C are conceptual views illustrating an example of a mobile terminal according to an embodiment of the present invention, which are viewed from different directions.
Figure 1C:
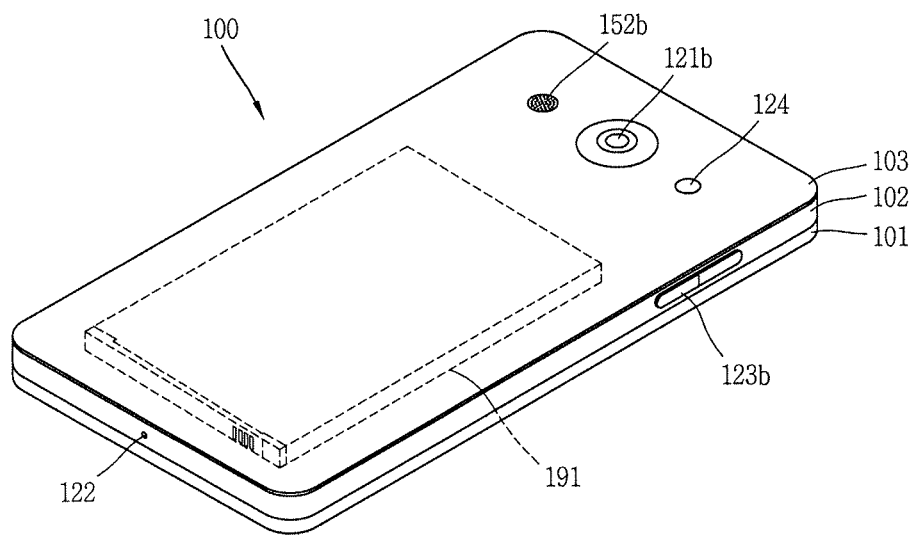

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and can be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 can be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 can have an inter-layered structure or an integrated structure with a touch sensor in order to facilitate a touch screen. The touch screen can provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, can include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 can be configured to store application programs executed in the mobile terminal 100, data or instructions for operations of the mobile terminal 100, and the like. Some of these application programs can be downloaded from an external server via wireless communication. Other application programs can be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 can include a battery, and the battery can be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel can include a satellite channel, a terrestrial channel, or both. In some embodiments, two or more broadcast receiving modules 111 can be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module can be internally or externally coupled to the mobile terminal 100. The wireless Internet module 113 can transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 can transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which can be configured similarly to mobile terminal 100) can be a wearable device, for example, a smart watch, a smart glass or a head mounted display (HMD), which can exchange data with the mobile terminal 100 (or otherwise cooperate with the mobile terminal 100). The short-range communication module 114 can sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 can be configured to permit various types of input to the mobile terminal 120. Examples of such input include audio, image, video, data, and user input. Image and video input is often obtained using one or more cameras 121. Such cameras 121 can process image frames of still pictures or video obtained by image sensors in a video or image capture mode. The processed image frames can be displayed on the display unit 151 or stored in memory 170. In some cases, the cameras 121 can be arranged in a matrix configuration to permit a plurality of images having various angles or focal points to be input to the mobile terminal 100. As another example, the cameras 121 can be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 can include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key can be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 can be implemented using any of a variety of sensors, some of which will now be described in more detail.

The proximity sensor 141 can include a sensor to sense presence or absence of an object approaching a surface, or an object located near a surface, by using an electromagnetic field, infrared rays, or the like without a mechanical contact. The proximity sensor 141 can be arranged at an inner region of the mobile terminal covered by the touch screen, or near the touch screen.

The proximity sensor 141, for example, can include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor can be configured to convert changes of pressure applied to a specific part of the display unit 151, or convert capacitance occurring at a specific part of the display unit 151, into electric input signals. The touch sensor can also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals can be transmitted to a touch controller. The touch controller can process the received signals, and then transmit corresponding data to the controller 180. Accordingly, the controller 180 can sense which region of the display unit 151 has been touched. Here, the touch controller can be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor can be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor can be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source can be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor can be configured to scan movement of the physical object in proximity to the touch screen. In more detail, the photo sensor can include photo diodes and transistors at rows and columns to scan content received at the photo sensor using an electrical signal which changes according to the quantity of applied light. Namely, the photo sensor can calculate the coordinates of the physical object according to variation of light to thus obtain position information of the physical object.

The display unit 151 is generally configured to output information processed in the mobile terminal 100. For example, the display unit 151 can display execution screen information of an application program executing at the mobile terminal 100 or user interface (UI) and graphic user interface (GUI) information in response to the execution screen information.

In some embodiments, the display unit 151 can be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image can include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image can be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data can be obtained from any of a number of different sources, such that the audio data can be received from the wireless communication unit 110 or the memory 170. The audio data can be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 can also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 can output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 can be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule notice, an email reception, information reception through an application, and the like.

A signal output by the optical output module 154 can be implemented so the mobile terminal emits monochromatic light or light with a plurality of colors. The signal output can be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 can include wired or wireless headset ports, external power supply ports, wired or wireless data ports, memory card ports, ports for connecting a device having an identification module, audio input/output (I/O) ports, video I/O ports, earphone ports, or the like.

The identification module can be a chip that stores various information for authenticating authority of using the mobile terminal 100 and can include a user identity module (UIM), a subscriber identity module (SIM), a universal subscriber identity module (USIM), and the like. In addition, the device having the identification module (also referred to herein as an "identifying device") can take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 can store data related to various patterns of vibrations and audio which are output in response to touch inputs on the touch screen.

The memory 170 can include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 can include a battery, which is typically rechargeable or be detachably coupled to the terminal body for charging.

The power supply unit 190 can include a connection port. The connection port can be configured as one example of the interface unit 160 to which an external charger for supplying power to recharge the battery is electrically connected.

As another example, the power supply unit 190 can be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein can be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 can be mounted to the front case 101 to form the front surface of the terminal body together with the front case 101.

In some embodiments, electronic components can also be mounted to the rear case 102. Examples of such electronic components include a detachable battery 191, an identification module, a memory card, and the like. Rear cover 103 is shown covering the electronic components, and this cover can be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 can also be completely shielded by the rear cover 103. In some embodiments, the rear cover 103 may include an opening for externally exposing a camera 121b or an audio output module 152b.

The cases 101, 102, 103 can be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a rear surface.

If desired, the mobile terminal 100 can include a waterproofing unit for preventing introduction of water into the terminal body. For example, the waterproofing unit can include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant invention. Some components can be omitted or rearranged. For example, the first manipulation unit 123a can be located on another surface of the terminal body, and the second audio output module 152b can be located on the side surface of the terminal body.

The display unit 151 outputs information processed in the mobile terminal 100. The display unit 151 can be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 can be implemented using two display devices, which can implement the same or different display technology. For instance, a plurality of the display units 151 can be arranged on one side, either spaced apart from each other, or these devices can be integrated, or these devices may be arranged on different surfaces.

The display unit 151 can also include a touch sensor which senses a touch input received at the display unit. When a touch is input to the display unit 151, the touch sensor can be configured to sense this touch and the controller 180, for example, may generate a control command or other signal corresponding to the touch. The content which is input in the touching manner may be a text or numerical value, or a menu item which can be indicated or designated in various modes.

The touch sensor can be configured in a form of a film having a touch pattern, disposed between the window 151a and a display on a rear surface of the window 151a, or a metal wire which is patterned directly on the rear surface of the window 151a. Alternatively, the touch sensor can be integrally formed with the display. For example, the touch sensor can be disposed on a substrate of the display or within the display.

The display unit 151 can also form a touch screen together with the touch sensor. Here, the touch screen can serve as the user input unit 123 (see FIG. 1A). Therefore, the touch screen can replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b can also be commonly referred to as a manipulating portion, and can employ any tactile method that allows the user to perform manipulation such as touch, push, scroll, or the like. The first and second manipulation units 123a and 123b can also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b can be used in various ways. For example, the first manipulation unit 123a can be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit can be located on the rear surface of the terminal body. The rear input unit can be manipulated by a user to provide input to the mobile terminal 100. The input can be used in a variety of different ways. For example, the rear input unit can be used by the user to provide an input for power on/off, start, end, scroll, control volume level being output from the first or second audio output modules 152a or 152b, switch to a touch recognition mode of the display unit 151, and the like. The rear input unit can be configured to permit touch input, a push input, or combinations thereof.

The rear input unit may be located to overlap the display unit 151 of the front side in a thickness direction of the terminal body. As one example, the rear input unit can be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit can implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 can include a finger scan sensor which scans a user's fingerprint. The controller 180 can then use fingerprint information sensed by the finger scan sensor as part of an authentication procedure. The finger scan sensor can also be installed in the display unit 151 or implemented in the user input unit 123.

The microphone 122 is shown located at an end of the mobile terminal 100, but other locations are possible. If desired, multiple microphones can be implemented, with such an arrangement permitting the receiving of stereo sounds.

The interface unit 160 may serve as a path allowing the mobile terminal 100 to interface with external devices. For example, the interface unit 160 can include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a can alternatively be located at other locations, or made to be moveable, in order to have a different image capturing direction from that which is shown.

The second camera 121b can include a plurality of lenses arranged along at least one line. The plurality of lenses can also be arranged in a matrix configuration. The cameras may be referred to as an "array camera." When the second camera 121b is implemented as an array camera, images can be captured in various manners using the plurality of lenses and images with better qualities.

As shown in FIG. 1C, a flash 124 is shown adjacent to the second camera 121b. When an image of a subject is captured with the camera 121b, the flash 124 can illuminate the subject.

As shown in FIG. 1B, the second audio output module 152b can be located on the terminal body. The second audio output module 152b can implement stereophonic sound functions in conjunction with the first audio output module 152a, and can be also used for implementing a speaker phone mode for call communication.

At least one antenna for wireless communication can be located on the terminal body. The antenna can be installed in the terminal body or formed by the case. For example, an antenna which configures a part of the broadcast receiving module 111 may be retractable into the terminal body. Alternatively, an antenna can be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 can receive power via a power source cable connected to the interface unit 160. Also, the battery 191 can be recharged in a wireless manner using a wireless charger. Wireless charging can be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 can be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal can be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
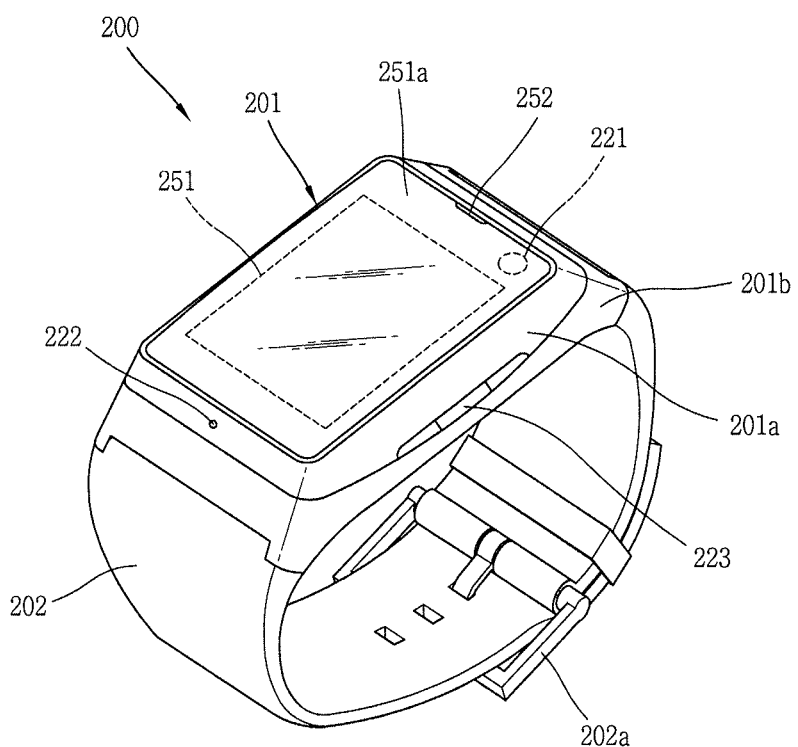
FIG. 2 is a perspective view illustrating an example of a watch-type mobile terminal according to another embodiment of the present invention.

FIG. 2 is a perspective view illustrating one example of a watch-type mobile terminal 200 in accordance with another embodiment. As illustrated in FIG. 2, the watch-type mobile terminal 200 includes a main body 201 with a display unit 251 and a band 202 connected to the main body 201 to be wearable on a wrist. In general, mobile terminal 200 can be configured to include features that are the same or similar to that of mobile terminal 100 of FIGS. 1A-1C.

The main body 201 can include a case having a certain appearance. As illustrated, the case can include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna can extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys can be minimized or eliminated. For example, when the touch screen is implemented, the user input unit 223 may be omitted.

The band 202 is commonly worn on the user's wrist and can be made of a flexible material for facilitating wearing of the device. As one example, the band 202 can be made of fur, rubber, silicon, synthetic resin, or the like. The band 202 can also be configured to be detachable from the main body 201. Accordingly, the band 202 may be replaceable with various types of bands according to a user's preference.

In one configuration, the band 202 can be used for extending the performance of the antenna. For example, the band may include therein a ground extending portion electrically connected to the antenna to extend a ground area.

The band 202 can include fastener 202a. The fastener 202a can be implemented into a buckle type, a snap-fit hook structure, a Velcro® type, or the like, and include a flexible section or material. The drawing illustrates an example that the fastener 202a is implemented using a buckle.

The location information module 115 is generally configured to detect, calculate, or otherwise identify a position of the mobile terminal. As an example, the location information module 115 can include a Global Position System (GPS) module, a Wi-Fi module, or both. If desired, the location information module 115 can alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite can be used. In particular, the GPS module can acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position can be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server can receive the information of the wireless AP connected to the mobile terminal 100 as described above, and can extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server can extract only a predetermined number of wireless AP information in order of high RSSI. Then, the Wi-Fi location determination server can extract (analyze) location information of the mobile terminal 100 using at least one wireless AP information extracted from the database.

A method for extracting (analyzing) location information of the mobile terminal 100 can include a Cell-ID method, a fingerprint method, a trigonometry method, a landmark method, and the like. The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals. The landmark method is used to measure a position of a mobile terminal using a known landmark transmitter.

In addition to these position location methods, various algorithms can be used to extract (analyze) location information of a mobile terminal. Such extracted location information can be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 can be variously changed according to a wireless communication environment within which the mobile terminal 100 is positioned.

As previously described with regard to FIG. 1A, the mobile terminal can be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module cam operate in one of a card mode, a reader mode, or a P2P mode. The mobile terminal 100 can further include a security module for storing card information, in order to operate the NFC module in a card mode. The security module can be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange can be performed between the NFC module and the security module.

When the NFC module operates in a card mode, the mobile terminal can transmit card information on a general IC card to the outside. More specifically, if a mobile terminal having card information on a payment card (e.g., a credit card or a bus card) approaches a card reader, a short-range mobile payment can be executed. As another example, if a mobile terminal which stores card information on an entrance card approaches an entrance card reader, an entrance approval procedure may start. A card such as a credit card, a traffic card, or an entrance card can be included in the security module in the form of applet, and the security module can store card information on the card mounted therein. Card information for a payment card can include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller can execute a text viewer. If the data received from the external tag is a URI type, the controller can execute a browser or originate a call. If the data received from the external tag is a general control type, the controller can execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) can be applied to the P2P communication. For P2P communication, connection can be generated between the mobile terminal and another mobile terminal. This connection can be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

The present invention relates to a watch-type mobile terminal, and may include at least one component shown in FIGS. 1A to 2. Hereinafter, a watch-type mobile terminal according to an embodiment of the present invention will be explained in more detail.

Figure 3A:
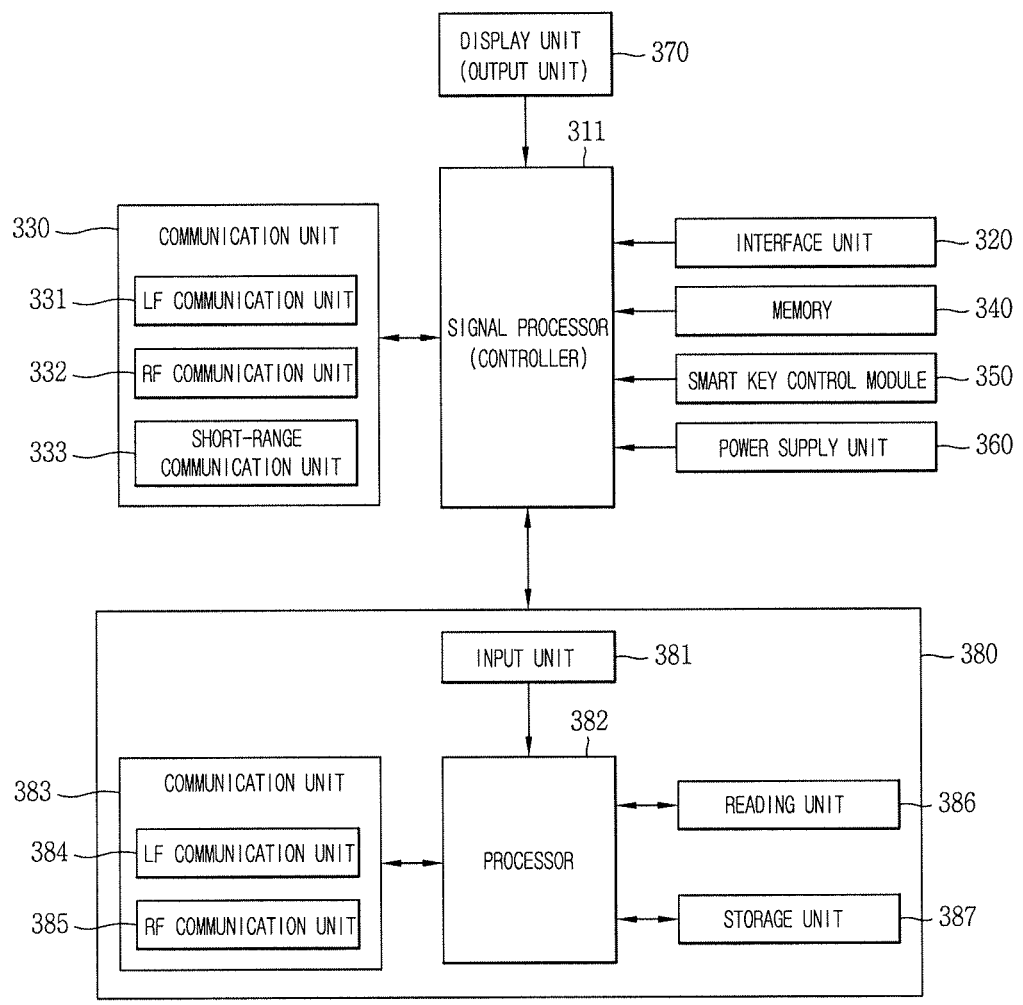
FIGS. 3A to 3C are conceptual views illustrating a watch-type mobile terminal according to an embodiment of the present invention.
Figure 3B:
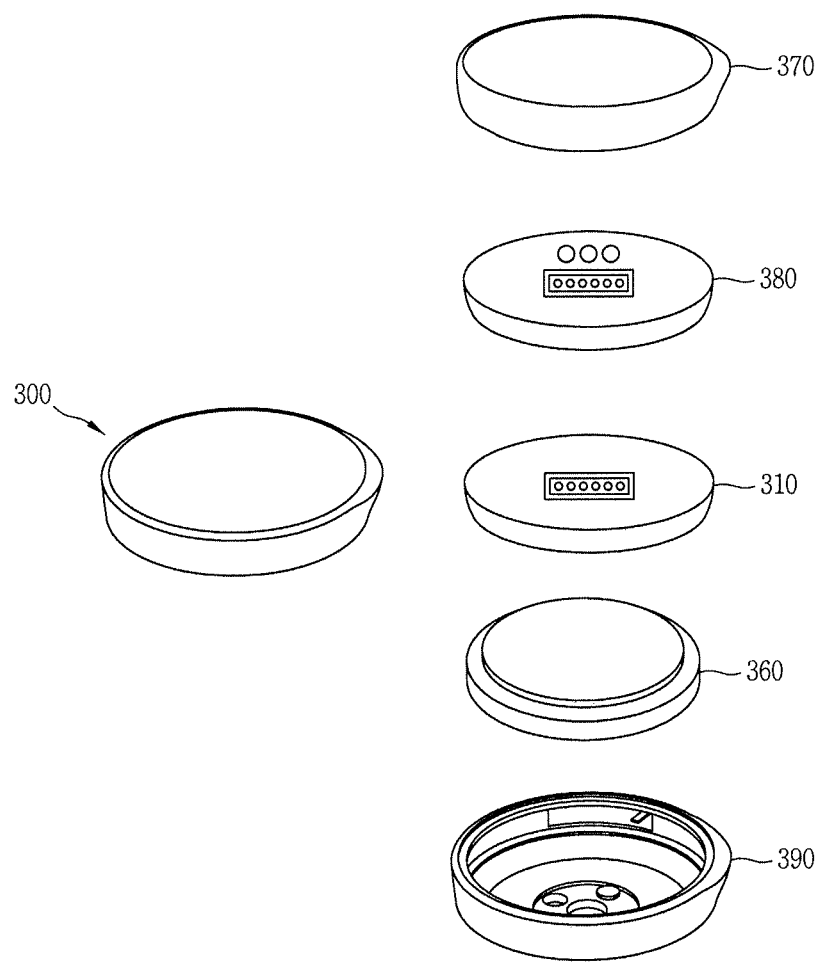
Figure 3C:
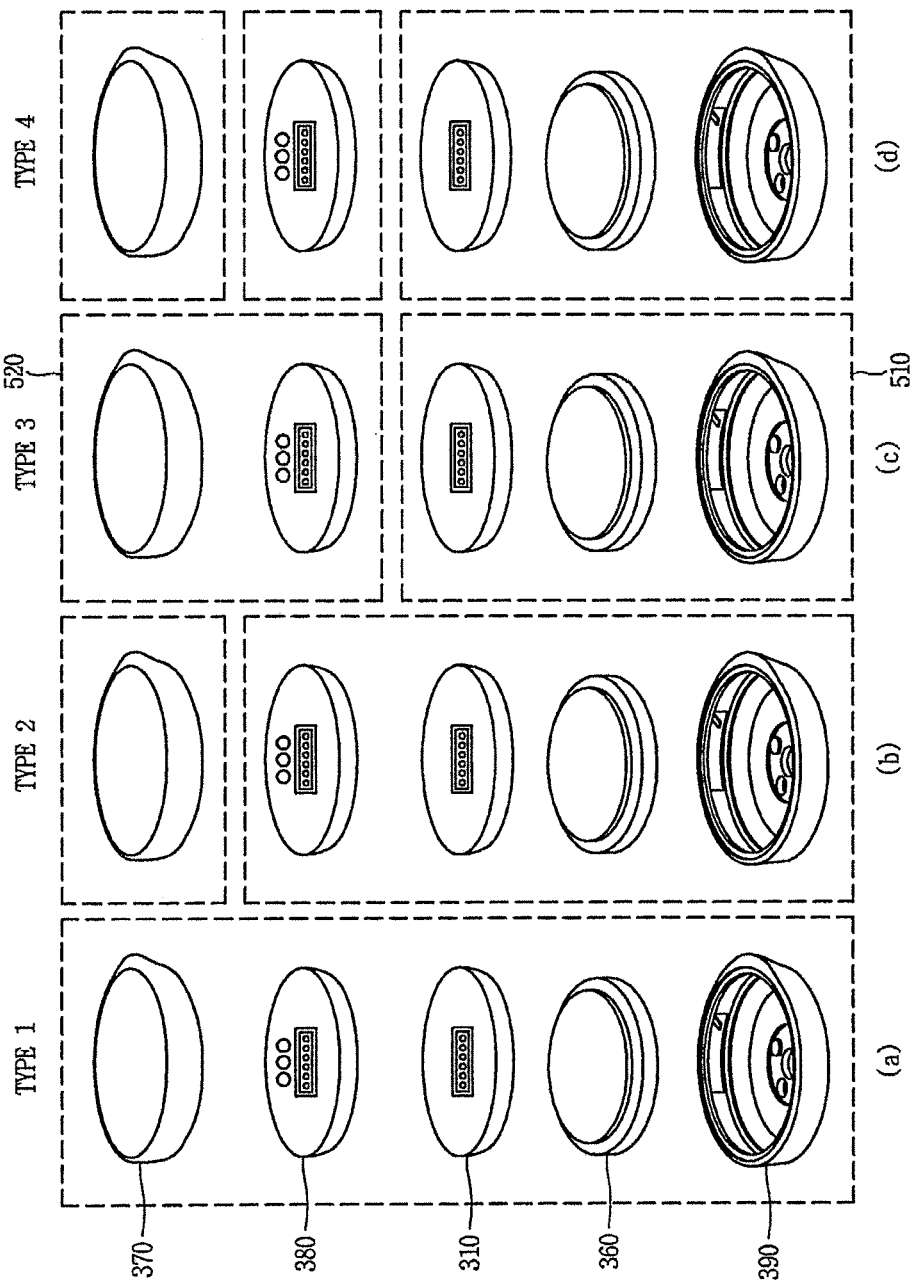

FIGS. 3A to 3C are conceptual views illustrating a watch-type mobile terminal according to an embodiment of the present invention. Referring to FIG. 3A, the watch-type mobile terminal according to an embodiment of the present invention can include an FOB module configured to control a vehicle.

The FOB module has a function to control a vehicle (or a vehicle-related function). For instance, once a user input is applied through a display unit or a user input unit of the watch-type mobile terminal, the FOB module may control a vehicle to execute a function corresponding to the user input.

The watch-type mobile terminal including the FOB module can be used by being coupled to the band 202 of FIG. 2. From this point of view, the watch-type mobile terminal of the present invention may serve as an electronic key for a vehicle or a smart key for a vehicle.

The FOB module may execute various functions of the conventional smart key for a vehicle. For instance, the FOB module can execute a vehicle door opening/closing function, a trunk opening/closing function, an emergency lamp-on function, a klaxon output function, an immobilizer function, etc.

Further, the FOB module can differentially set a control right of a vehicle. The control rights of a vehicle may be set in a state where the FOB module has been attached to a main system. When the FOB module has been detached from the main system, the control rights of a vehicle may be set through a user authentication, or through a pre-authenticated external terminal (e.g., a mobile terminal of a user who possesses the watch-type mobile terminal, or a mobile terminal which has executed authentication with the watch-type mobile terminal). The watch-type mobile terminal according to an embodiment of the present invention may be referred to as an FOB key, an immobilizer key, an electronic key, a smart key, a card key, etc.

FIG. 3A is a block diagram illustrating a configuration of the watch-type mobile terminal according to an embodiment of the present invention. Referring to FIG. 3A, the watch-type mobile terminal according to an embodiment of the present invention 200 can include a main system 310. The main system 310 can be implemented in the form of a module or a substrate, and can be detachably mounted to the FOB module electrically or physically (refer to FIG. 3B). The main system 310 can include a signal processor 311, an interface unit 320, a communication unit 330, a memory 340, a smart key control module 350, and a power supply unit 360.

The signal processor 311 (or the controller 180) can process signals transmitted to components of the main system 310. And the main system 310 can be provided with at least one of the components shown in FIG. 1A. For instance, the signal processor 311 can be the controller 180 shown in FIG. 1A.

The interface unit 320 can be connected to a vehicle controller provided at a vehicle, so as to be communicated in a wired or wireless manner. The interface unit 320 can be provided with one or more buttons for one or more vehicle-related functions, and can receive a user's command through each of the buttons. The interface unit 320 can transmit the user's command received through the button to the smart key control module 350, via the signal processor 311.

The interface unit 320 can be connected to the vehicle controller (or a vehicle driving unit) in a wired or wireless manner, and can be connected to the FOB module 380 so as to be communicated in a wired or wireless manner.

Once a signal is received from the FOB module 380 through the communication unit 330, the interface unit 320 can transmit the signal to the vehicle controller. For instance, if a starting signal is received from the FOB module 380, the interface unit 320 can transmit the starting signal to the vehicle controller such that the vehicle can be started. The interface unit 320 can be the interface unit 160 of FIG. 1A.

The communication unit 330 can be provided with a communication module which supports a communication interface unit for signal transception (transmission and reception) with the FOB module 380. For instance, the communication unit 330 can be provided with an LF communication unit 331 which transmits a low frequency (LF) signal of a preset frequency band (e.g., 125 kHz or 134 kHz) to the FOB module 380. And the communication unit 330 can be provided with an RF communication unit 332 which receives a radio frequency (RF) signal of a preset frequency band (e.g., 433 MHz) from the FOB module 380.

The communication unit 330 can be further provided with a communication module which supports a communication interface unit for signal transception with the mobile terminal 100. For instance, the communication unit 330 can be provided with a short-range communication unit 333 which transceives a signal with the mobile terminal via near field communication (NFC), Bluetooth, etc.

The communication unit 330 can be the wireless communication unit 110 of FIG. 1A. And the communication unit 330 can be provided at the FOB module 380 and/or a display unit 370, as well as the main system 310.

A setting value for operating the main system 310 can be stored in the memory 340. For instance, the memory 340 can store information about a frequency of a signal of the FOB module 380, the information set for signal transception with the FOB module 380. The memory 340 can store therein information about a control right to control the vehicle, and information about user authentication. The memory 340 can store therein a control algorithm which generates a control command for controlling a driving of the vehicle, by using a signal received from the FOB module 380. The memory 340 can store information set for signal transception with the mobile terminal 100, and can store a control algorithm to control a power level of the mobile terminal 100. The memory 340 may be the memory 170 of FIG. 1A.

Once a function of the vehicle is executed, the smart key control module 350 receives a signal related to the executed function, through the interface unit 220. Once the signal related to the executed function is received, the smart key control module 350 generates a wake-up signal for driving the FOB module 380, and transmits the wake-up signal to the FOB module 380 through the LF communication unit 331.

If data of a response signal received from the FOB module 380 is consistent with pre-registered data, the smart key control module 350 determines that authentication of the FOB module 380 has succeeded. Then, the smart key control module 350 transmits a control command input through the interface unit 320, to the FOB module 380 through the LF communication unit 331. In this instance, if a starting signal corresponding to a request signal is received through the RF communication unit 332, the smart key control module 350 controls a command for operating the vehicle driving unit, to be output through the interface unit 320, based on the starting signal.

On the contrary, if data of the response signal received from the FOB module 380 through the RF communication unit 332 is not consistent with the pre-registered data, the smart key control module 350 determines authentication of the FOB module 380 has failed.

So far, the configuration of the smart key control module 350 has been explained for convenience. However, the present invention is not limited to this. That is, the configuration, functions and features of the smart key control module 350 can be executed by the signal processor 311 (or the controller 180).

The power supply unit 360 for supplying power to the watch-type mobile terminal 200 can be provided at the watch-type mobile terminal 200. The power supply unit 360 can be a battery mounted in the watch-type mobile terminal 200, or can be a battery detachably mounted to the watch-type mobile terminal 200. The power supply unit 360 may be the power supply unit 190 of FIG. 1A.

The battery can be configured to receive power through a power cable connected to the interface unit 320. The battery can be formed to be wirelessly charged by a wireless charging device. The wireless charging can be implemented by using at least one of an inductive coupling method which is based on magnetic induction or a magnetic resonance coupling method which is based on electromagnetic resonance.

The FOB module 380 according to an embodiment of the present invention includes a processor 382, an input unit 381, a communication unit 383, a reading unit 386 and a storage unit 387. The processor 382 (or the controller) controls an operation of the components of the FOB module 380.

At least one manipulation button can be provided at the FOB module 380. When the button of the FOB module 380 is manipulated, a command corresponding to the manipulated button can be input to the input unit 381.

The communication unit 383 can be provided with a communication module which supports a communication interface for signal transception with the main system 310. For instance, the communication unit 383 can be provided with an LF communication unit 384 which receives a low frequency (LF) signal of a preset frequency band (e.g., 125 kHz or 134 kHz) from the main system 310. And the communication unit 383 can be provided with an RF communication unit 385 which transmits a radio frequency (RF) signal of a preset frequency band (e.g., 433 MHz) to the main system 310. The communication unit 383 may be the wireless communication unit 110 of FIG. 1A.

The reading unit 386 reads a signal received through the LF communication unit 384. For instance, the reading unit 386 can read a driving signal received through the LF communication unit 384, and read a request signal received through the LF communication unit 384 when authentication of the FOB module 380 is completed. The processor 382 generates a response signal according to a reading result by the reading unit 386, and transmits the generated response signal to the main system 310 through the RF communication unit 385. In this instance, the processor 382 may compare the reading result by the reading unit 386 with data stored in the storage unit 387, and may generate the response signal according to a result of the comparison.

That is, when a driving signal is received from the main system 310, the processor 382 compares the reading result by the reading unit 386 with the data stored in the storage unit 387. If the reading result and the data are consistent with each other, the processor 382 generates a response signal to check the received driving signal, and transmits the response signal to the main system 310. On the contrary, if the reading result by the reading unit 386 is not consistent with the data stored in the storage unit 387, the processor 382 determines that an error has occurred, and transmits an error signal to the main system 310.

A communication setting value for signal transception between the FOB module 380 and the main system 310 can be stored in the storage unit 387, and information for signal generation can be stored in the storage unit 387.

The display unit 370 displays information processed by at least one of the FOB module 380 and the main system 310. For instance, the display unit 370 can display information about an execution screen of an application program driven by at least one of the FOB module 380 and the main system 310, or User Interface (UI) or Graphic User Interface (GUI) information about the execution screen information. And the display unit 370 can be formed as a stereoscopic display unit for displaying stereoscopic images (3D images). The stereoscopic display unit can employ a stereoscopic display scheme such as a stereoscopic scheme (a glass scheme), an auto-stereoscopic scheme (glassless scheme), a projection scheme (holographic scheme), or the like.

FIG. 3B is a perspective view and an exploded perspective view of a watch-type mobile terminal according to an embodiment of the present invention. A body 300 (or 201) of the watch-type mobile terminal according to an embodiment of the present invention may include the FOB module 380 configured to control a vehicle.

As shown in FIG. 3B, the body 300 (or 201) of the watch-type mobile terminal 200 according to an embodiment of the present invention can include the display unit 370, the FOB module 380, the main system 310, the power supply unit 360 and a main frame 390. The main frame 390 may refer to at least one of the first case 201a and the second case 201b of FIG. 2, or a combination thereof.

The main frame 390 can serve as a case for coupling thereto at least one of the display unit 370, the FOB module 380, the main system 310 and the power supply unit (battery) 360. In addition, the main frame 390 can be formed such that the band 202 of FIG. 2 can be coupled thereto.

FIG. 3B illustrates that the body 300 of the watch-type mobile terminal 200 has a circular shape. However, the present invention is not limited to this. That is, the body 300 of the watch-type mobile terminal 200 can have an oval shape or a polygonal shape.

The body 300 of the watch-type mobile terminal 200 may be formed as an integral type (first type). Alternatively, the body 300 can be formed such that at least one of the display unit 370, the FOB module 380 and the main system 310 can be operated independently in a separated manner.

For instance, only the display unit can be individually used (second type), or the display unit and the FOB module can be integrally formed with each other to be individually used (third type). Alternatively, the FOB module may be selectively coupled to the display unit or the main system (fourth type).

That is, in an embodiment, only the display unit can be used, or the display unit and the FOB module can be integrally formed with each other to be separated from the main system 310. Alternatively, the display unit, the FOB module and the main system 310 can be individually used in a separated manner.

Even if at least one of the display unit 370, the FOB module 380 and the main system 310 is individually used in a separated manner, a communication unit (e.g., the wireless communication unit 110 of FIG. 1A) is provided at each of the components for reciprocal communication.

The watch-type mobile terminal 200 according to an embodiment of the present invention can be interworked with another mobile terminal, e.g., a smartphone. For instance, a mobile terminal and a vehicle may execute wireless communication using a mobile communication network, by a low frequency (LF) communication method and a radio frequency (RF) communication method. And the watch-type mobile terminal 200 and the mobile terminal can execute wireless communication via Bluetooth. The mobile terminal can be a smartphone having therein an exclusive application related to each function of the vehicle. The smartphone means the mobile terminal of FIGS. 1A to 1C, and can include all types of wireless communication devices which can execute wireless communication through a mobile communication network or via Bluetooth, such as a portable phone, a notebook computer, a digital broadcasting terminal, a Personal Digital Assistants (PDA), a Portable Multimedia Player (PMP), and a tablet PC. Hereinafter, for convenience, said another mobile terminal will be referred to as a smartphone or a preset external terminal. As aforementioned, the FOB module 380 can be any type which applies an electrical signal through wireless communication with the smart key control module of the vehicle, e.g., an FOB key, a card key, etc.

Hereinafter, first to fourth types of the watch-type mobile terminal 200 according to an embodiment of the present invention will be explained. The first to fourth types are categorized according to a selective coupling of the FOB module 380 formed to be separable. That is, the FOB module 380 can be coupled to the display unit 370 and the main system 310. For this, connectors are formed at upper and lower parts of the FOB module 380, and a connection terminal electrically connected to the FOB module is formed at an upper part of the main system 310.

The first type may be a type that the FOB module is mounted to the band. When the first type, the watch-type mobile terminal 200 is operated like a general smart watch, and has the same appearance as the general smart watch.

The second type can be a type that the display unit 370 is separated from the FOB module 380 so as to be mountable to a preset external terminal, and the FOB module 380 and the main system 310 are coupled to each other to be connected to the band. When the second type, the display unit 370 can be coupled to a rear surface of the preset external terminal, thereby providing a rear display to a rear surface of a terminal body, the rear display different from a front display provided on a front surface of the terminal body. Hereinafter, the display unit of the preset external terminal will be referred to as a first display unit, and the display unit 370 of the watch-type mobile terminal 200 will be referred to as a second display unit.

The second display unit provided on a rear surface of the watch-type mobile terminal can simply display information about a user or a vehicle, rather than display a large amount of information, due to its small size. In this instance, the second display unit can be used for a user to input information in a touch manner, like the first display unit.

According to the second type, the FOB module 380 coupled to the band can be used with no display unit, and simple information can be output through other output unit rather than the second display unit. In this instance, the watch-type mobile terminal 200 can serve as an activity tracker, since the FOB module 380 is in a coupled state to the band. For instance, the watch-type mobile terminal 200 having the display unit separated therefrom can be used as a pedometer, or can execute a health care function by a heartbeat sensor, etc. However, since the FOB module 380 is in a coupled state to the band, the watch-type mobile terminal 200 can control an external device (vehicle).

The third type is a type that the second display unit 370 is coupled to the FOB module 380, and the FOB module 380 and the main system 310 are separated from each other. For instance, the FOB module 380 separated from the main system 310, and the display unit 370 can be mounted to a rear surface of a preset external terminal. In this instance, since the second display unit 370 is coupled to the preset external terminal together with the FOB module 380, the external device (vehicle) can be controlled by the preset external terminal. And information and a user interface to control the external device (vehicle) can be displayed on the second display unit 370.

In this instance, even if the main system is connected to the band and the FOB module 380 is separated from the main system, an external device (vehicle) can be controlled. For instance, a control function with respect to the external device (vehicle), provided at the FOB module 380, can be also provided at the main system 310. Thus, even if the FOB module 380 is separated from the main system 310, a user can control the external device (vehicle) by using the main system 310.

In the present invention, different control rights can be set to the FOB module 380 and the main system 310. For instance, a first control right for executing only a predetermined function of the external device may be set to the FOB module 380 (e.g., unlocking the vehicle). And a second control right for executing all functions of the external device, which is higher than the first control right, may be set to the main system 310 (e.g., unlocking the vehicle, starting the vehicle, access vehicle status information). If the control right with respect to the external device is set only to the FOB module 380, the main system 310 coupled to the band may execute only a predetermined function such as an activity tracking function.

The fourth type can be a type that the display unit 370, the FOB module 380 and the main system 310 are separated from each other to be usable individually. Thus, the FOB module 380 may be used independently, or can be used in a coupled state to the main system 310 or the display unit 370.

The fourth type is a case where a mounting position of the FOB module 380 is selectively switchable. In this instance, if the FOB module is coupled to the main system, the fourth type may be similar to the aforementioned second type. On the contrary, if the FOB module is coupled to the second display unit, the fourth type may be similar to the aforementioned third type.

Each of the display unit 370 and the FOB module 380 can be provided with a battery and a predetermined processor, such that at least one of the display unit 370 and the FOB module 380 is separately usable according to the second to fourth types. Each of the display unit 370, the FOB module 380 and the main system 310 can be provided with the wireless communication unit 110 for reciprocal communication.

Hereinafter, as shown in FIG. 3C(c), will be explained a situation where the body 300 of the watch-type mobile terminal 200 is separated into a first body 510 and a second body 520. The first body 510 may include the main frame 390, the power supply unit 360 and the main system 310.

The second body 520 may include the FOB module 380 and the display unit 370 (or a display module). At least one of the FOB module 380 and the display unit 370 of the second body 520 may be provided with a battery. Accordingly, even if the second body 520 is separated from the first body 510, the second body 520 can be operable by the battery.

The controller 180 of FIG. 1A can be provided at the first body 510. For instance, the controller 180 can be provided at the main system 310 to control the first body 510 and the second body 520.

At least one of the FOB module 380 and the display unit 370 of the second body 520 can be provided with a processor. The processor can control an external device or transmit predetermined information to the signal processor 311 (or the controller 180) of the first body, based on a signal (a user input) received through the FOB module 380 and the display unit 370.

Each of the first body 510 and the second body 520 (the display unit 370 and the FOB module 380) can be provided with the wireless communication unit 110 of FIG. 1A. Accordingly, the first body 510 and the second body 520 can communicate with each other and/or communicate with an external device, by at least one of the aforementioned various communication methods.

Each of the first body 510 and the second body 520 (the display unit 370 and the FOB module 380) can be provided with the sensing unit 140 of FIG. 1A. Accordingly, even if the first body 510, the display unit 370 and the FOB module 380 are separated from each other, each of the components can sense information using a corresponding sensor included in the sensing unit 140.

Hereinafter, various embodiments of the watch-type mobile terminal according to an embodiment of the present invention will be explained in more detail with reference to the attached drawings.

Figure 4:
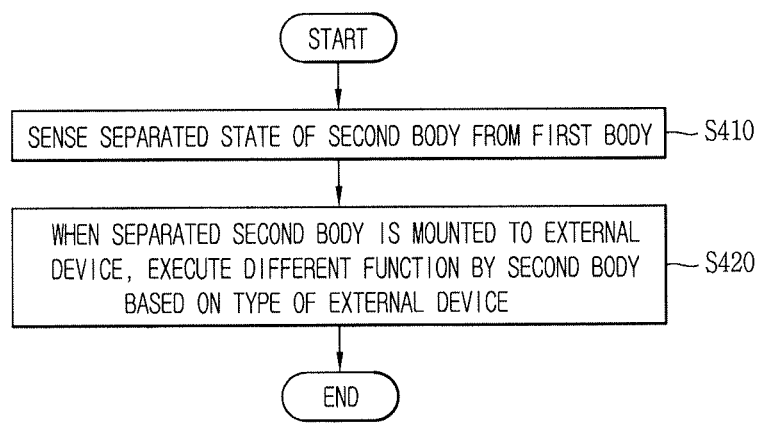
FIG. 4 is a flowchart illustrating a representative control method according to an embodiment of the present invention.
Figure 5:
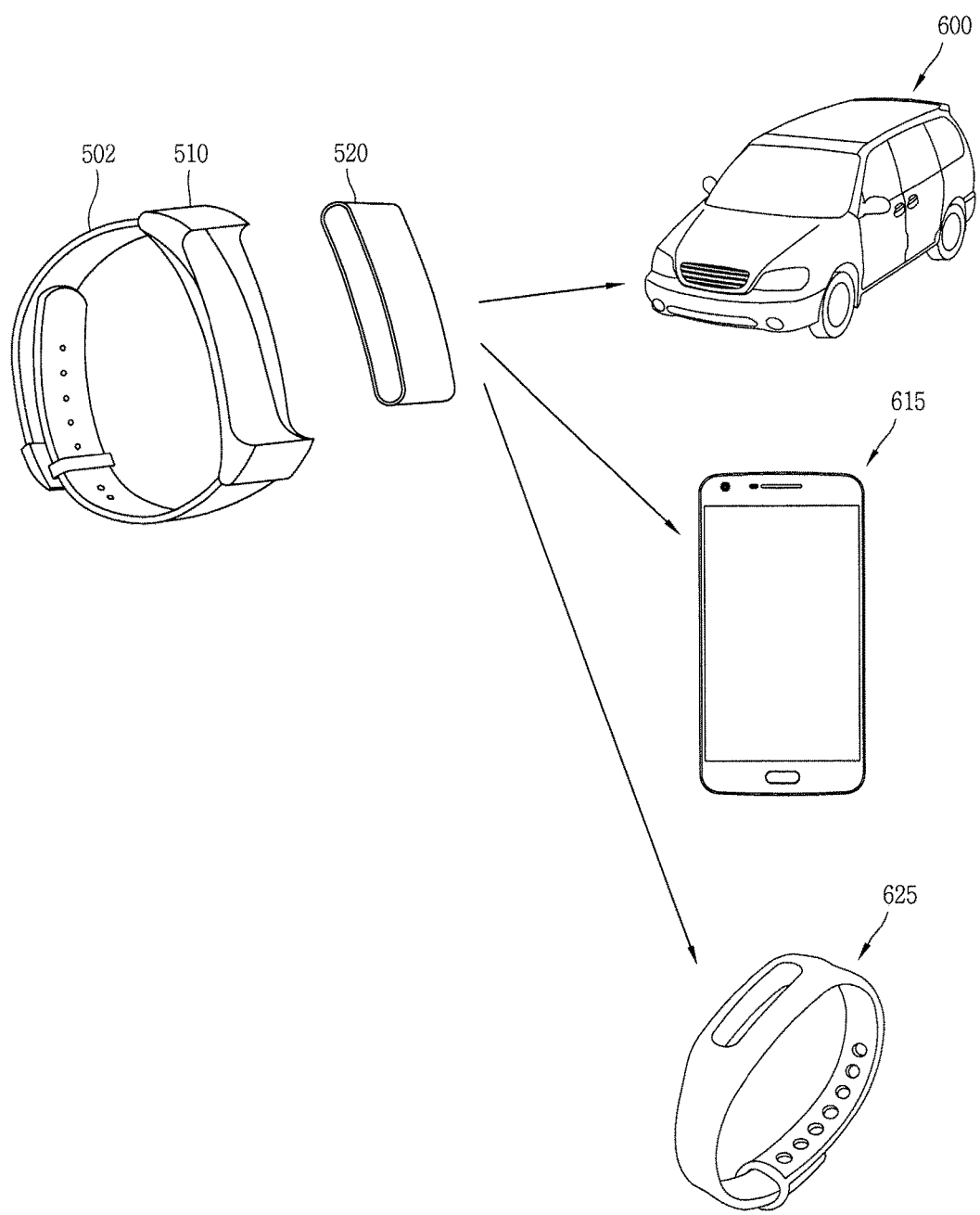
FIG. 5 is a conceptual view illustrating the control method of FIG. 4.

FIG. 4 is a flowchart illustrating a representative control method according to an embodiment of the present invention, and FIG. 5 is a conceptual view illustrating the control method of FIG. 4.

The watch-type mobile terminal according to an embodiment of the present invention can include a band 502 worn on a user's wrist to enclose the user's wrist. The band 502 may be the band 202 of FIG. 2. The band 502 can be connected to the main frame 390 of the first body 510. That is, the first body 510 can be formed to be connected to the band 502.

As shown in FIG. 3C(c), the first body 510 can include the main system 310, the power supply unit 360 and the main frame 390. The main system 310 can be provided with at least one of the components of FIG. 1A.

The watch-type mobile terminal 200 according to an embodiment of the present invention can include the second body 520 formed to be detachable from the first body. As shown in FIG. 3C(c), the second body 520 can include the FOB module 380 and the display unit 370.

The second body 520 can be separated from or connected to the first body 510 by a user. A connected state between the first body 510 and the second body 520 can include a physical connected state between the first body 510 and the second body 520, and an electrical connected state between the main system 310 of the first body 510 and the FOB module 380 of the second body 520 through a connector.

For convenience, it will be explained that the second body 520 includes the FOB module 380 and the display unit 370, and the processor 382 of the second body 520 is provided at the FOB module 380. However, the present invention is not limited to this. That is, the present invention can be also applicable to a situation where the first body includes the FOB module 380 and the main system 310, and the second body is the display unit 370. In the situation where the second body is the display unit 370, the processor may be provided at the display unit 370.

The signal processor 311 of the first body 510 (hereinafter, will be referred to as the controller 180 of FIG. 1A) can sense whether the second body 520 has been separated from or connected to the first body 510. In addition, the processor 382 of the second body 520 can sense whether the second body 520 has been separated from or connected to the first body 510. Once the second body 520 separated from the first body 510 is attached to an external device, the processor 382 can execute a different function based on a type of the external device.

The external device may include all types of devices (objects) formed to connect (attach) the second body 520 thereto. For instance, as shown in FIG. 5, the external device may be a vehicle 600, a mobile terminal 615, and a band 625 configured to accommodate the second body therein.

The second body 520 can be provided with a memory, and the memory can store therein information about functions to be executed according to types of external devices. If the external device is a first device, the second body 520 (processor 382) may execute a first function related to the first device. On the contrary, if the external device is a second device, the second body 520 (processor 382) may execute a second function related to the second device.

The first function and the second function may be different from each other. More specifically, if types (or purposes) of the first and second devices are included in different categories, functions of the first and second devices can be different from each other. Accordingly, the first and second functions can be different from each other.

For instance, if the external device is a first device (a vehicle), the processor 382 may control the second body 520 to execute a vehicle-related function. For example, the processor 382 may control the second body 520 to execute at least one of an output function to output vehicle-related information, a sensing function to sense vehicle-related information by the sensing unit of the second body 520, and a control function to control the vehicle.

An embodiment for executing a vehicle-related function by the second body 520 will be explained in more detail with reference to FIGS. 6A to 6E. As another example, if the external device is a second device (a mobile terminal or another unauthorized mobile terminal), the processor 382 can control the second body 520 to execute a function related to the mobile terminal.

For instance, the processor 382 can control the second body 520 to execute an output function to output information related to the mobile terminal, a process function to process a task required by the mobile terminal, a payment function, a user authentication function, etc. The processor 382 can classify a user according to a type of the mobile terminal, and can differently set a control right such that the vehicle is differently controlled according to the classified user.

As another example, when the second body 520 separated from the first body 510 is attached to the band rather than an electronic device, the processor 382 can control the second body 520 to execute only a simple function such as a function to acquire bio information of a contacted human body, a sleep control function, a date/time/calendar output function, and/or a pedometer function. If the external device is a device requiring an additional control, the second body 520 can control the external device based on at least one of a control command input through the display unit 370 or the FOB module 380 of the second body 520, and a control command input through the first body 510.

Hereinafter, a method for controlling an external device by the second body 520 will be explained in more detail with reference to the attached drawings.

FIGS. 6A to 6E are conceptual views illustrating a method for controlling a vehicle by the second body according to an embodiment of the present invention.

Figure 6A:
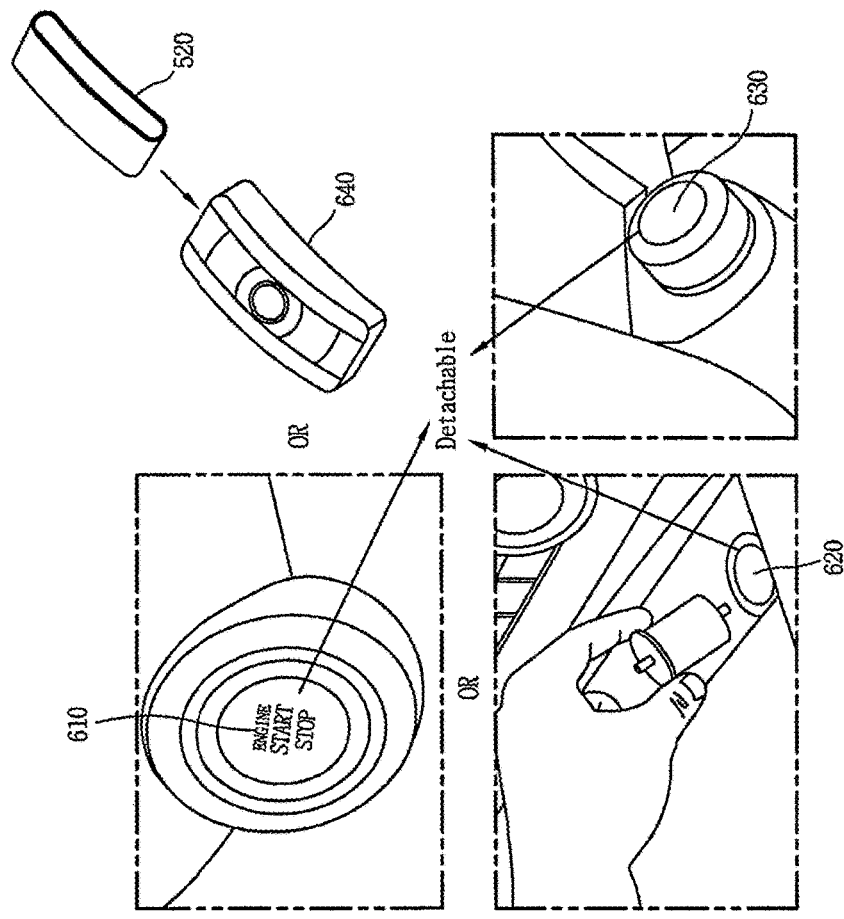
FIGS. 6A to 6E are conceptual views illustrating a method for controlling a vehicle by a second body according to an embodiment of the present invention.

Referring to FIG. 6A, the processor 382 of the second body 520 can be separated from the first body 510, and can be mounted to a vehicle 600, an example of an external device. In this instance, the processor 382 can execute a different function according to a coupling position to the vehicle 600.

For instance, as shown in FIG. 6A, the second body 520 separated from the first body 510 can be mounted to various modules of the vehicle 600. For example, the second body 520 can be mounted to a starting button 610 (an ignition on/off button), a lighter socket 620, an OBD charger 630, a smart key 640, etc. of the vehicle 600.

If the second body 520 is mounted to a first module of the vehicle 600, the processor 382 can execute a function related to the first module. And if the second body 520 is mounted to a second module of the vehicle 600, the processor 382 can execute a function related to the second module.

For instance, if the first module is the starting button 610, the processor 382 can execute a first function (at least one of a user authentication and a function to start the vehicle 600). The processor 382 may differently set a control right with respect to the vehicle, according to whether a user's authentication has succeeded or not in a coupled state of the second body 520 to the starting button 610.

The user's authentication can be a fingerprint recognition (or a fingerprint authentication). The second body 520 can be provided with a fingerprint recognition sensor. The fingerprint recognition sensor can be provided at the display unit 370, for instance.

Once the second body 520 is mounted to a first module of the vehicle (e.g., the starting button 610 (or once the second body 520 is mounted to a first module of the vehicle and then is pressed), the processor 382 can activate the fingerprint recognition sensor.

If a fingerprint authentication is successful, the processor 382 can set a first control right to control all functions of the vehicle. Further, if a fingerprint authentication is unsuccessful, the processor 382 can set a second control right to restrict an open state of a specific box of the vehicle, to restrict part of navigation functions of the vehicle, or to restrict a driving speed, a driving range, etc. of the vehicle.

When the second body 520 is attached to the starting button, the second body 520 can be used as a starting key. When the second body 520 is attached (mounted) to the starting button, the second body 520 can transmit information about its mounted state to the first body 510. Accordingly, when the second body 520 is provided to another person, the first body 510 can real-time monitor a usage stage of the second body 520.

Once the vehicle is driven after the second body 520 is attached to the starting button, information about the driving of the vehicle can be transmitted to the first body 510.

A second module different from the first module can be an On Board Diagnosis (OBD) charger 630 or a lighter socket 620. The OBD charger can be a socket for charging an OBD which monitors a state of the vehicle such as exhaust gas and evaporation gas of the vehicle.

The lighter socket 620 refers to a socket for charging a lighter of the vehicle, and can be generally used to charge an electronic device. Once the second body 520 is attached to the OBD charger 630 or the lighter socket 620, a battery of the second body 520 can be charged.

Once the second body 520 is provided at the second module (e.g., the OBD charger 630), the processor 382 can execute a second function different from the first function (e.g., at least one of a vehicle state sensing function and a vehicle information output function).

The smart key 640 can be provided with at least one of a button for locking or unlocking doors of the vehicle, a button for opening a trunk, and a button for operating a car horn or an emergency lamp. The smart key 640 may be provided with an immobilizer module, and can be used to start the vehicle only when disposed in the vehicle.

Once the second body 520 is attached to the smart key 640, the processor 382 can execute a function to transmit a driving state of the vehicle 600 to the first body 510 (or a preset mobile terminal) (a third function different from the first and second functions). With such a configuration, when the vehicle is used by another person, a driving state of the vehicle can be real-time monitored.

Hereinafter, will be explained an example to execute different functions according to a mounting position of the second body 520 of the watch-type mobile terminal to the vehicle 600.

Figure 6B:
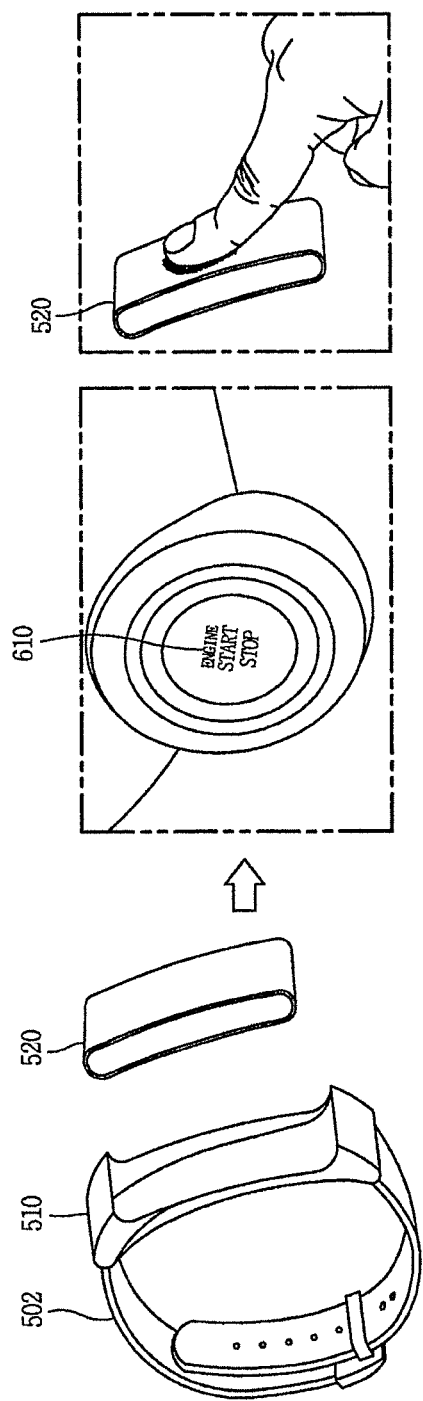

Referring to FIG. 6B, the processor 382 can set different control rights with respect to the vehicle, according to whether a fingerprint authentication by a fingerprint recognition sensor is successful or not after the second body 520 separated from the first body 510 of the watch-type mobile terminal has been attached to one module of the vehicle 600.

The fingerprint recognition sensor may be provided at the display unit 370 of the second body 520. Once a mounted state of the second body 520 to one module of the vehicle 600 is sensed, the processor 382 can activate the fingerprint recognition sensor.

Then, the processor 382 can extract fingerprint information from a finger which has touched the fingerprint recognition sensor, and can execute a fingerprint authentication based on the fingerprint information. When the second body 520 is pressed by a finger in an attached state to the starting button 610, the processor 382 can activate the fingerprint recognition sensor.

A vehicle controller can control the vehicle not to be started in a non-coupled state of the second body 520 to the starting button 610, even if the starting button 610 is pressed. As another example, when the starting button 610 to which the second body 520 has been coupled is pressed, in a state where a user authentication has failed, the vehicle controller can control the vehicle to be started. However, In this instance, the vehicle controller can set a control right (a second control right) to restrict at least one of functions of the vehicle. For instance, if a user uses a valet parking or a chauffeur service by separating the second body from the watch-type mobile terminal, the vehicle controller can control the second body 520 to control the vehicle with a second control right.

The second control right may be a right to restrict an open state of a specific box of the vehicle (e.g., a glove box, a console box, a trunk, etc.), or a right to restrict part of navigation functions of the vehicle (e.g., restricting display of history and bookmark), or a right to restrict a driving speed, a driving range, a driving distance, etc. of the vehicle.

In a set state of the second control right, upon sensing of an operation to execute a function restricted by a user of the vehicle, or when a driving speed, a driving range and a driving distance of the vehicle are out of a range, the second body 520 can transmit notification information to the first body or a preset mobile terminal (user's mobile terminal authenticated or interworked with the watch-type mobile terminal 200), through the communication unit. The notification information can include information about functions which are out of a range, information about a state of the vehicle, etc.

As another example, the vehicle controller can set a control right (first control right) to control starting and all functions of the vehicle, if the starting button 610 to which the second body 520 has been mounted is pressed, in a state where a user authentication (a fingerprint authentication) has succeeded.

In a set state of the first control right, the vehicle controller can automatically change a gradient of a seat (memory seat function), based on information related to the first control right.

The processor 382 can discern a user through the sensing unit of the second body. The processor 382 can control the vehicle such that a setting value of the vehicle according to the discerned user (e.g., a gradient of a seat, a navigation viewing information, etc.) can be applied, after the second body 520 is attached to the vehicle.

Figure 6C:
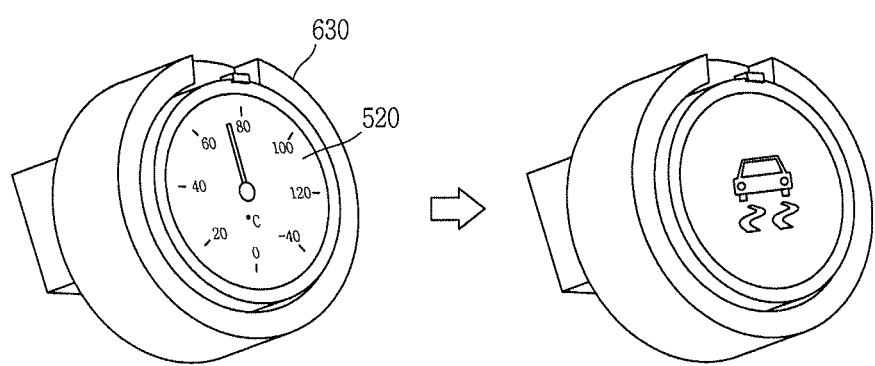

Referring to FIG. 6C, the second body 520 of the watch-type mobile terminal can be provided with the display unit 370. The processor 382 can output information about the vehicle 600 to the display unit 370 when the second body 520 is mounted (attached) to one module of the vehicle 600 (e.g., the OBD charger 630).

The processor 382 can output information about the vehicle 600 to the display unit 370 when the second body 520 is mounted to the OBD charger 630 or the lighter socket 620. For instance, the information about the vehicle 600 can include information about the inside of the vehicle, information about the outside of the vehicle, information about a road on which the vehicle is driving, information about an advanced driver assistance system (ADAS), information about a driver state monitoring (DSM), etc.

Referring to FIG. 6C, the processor 382 of the second body 520 can output part of information about the vehicle 600 (e.g., information about the inside of the vehicle) to the display unit 370 when the second body 520 is mounted to one module of the vehicle 600 (e.g., the OBD charger 630). In this instance, if new information (e.g., information about the outside of the vehicle) is sensed through the one module (OBD charger), the processor 382 can control the display unit 370 to display the sensed information.

Figure 6D:
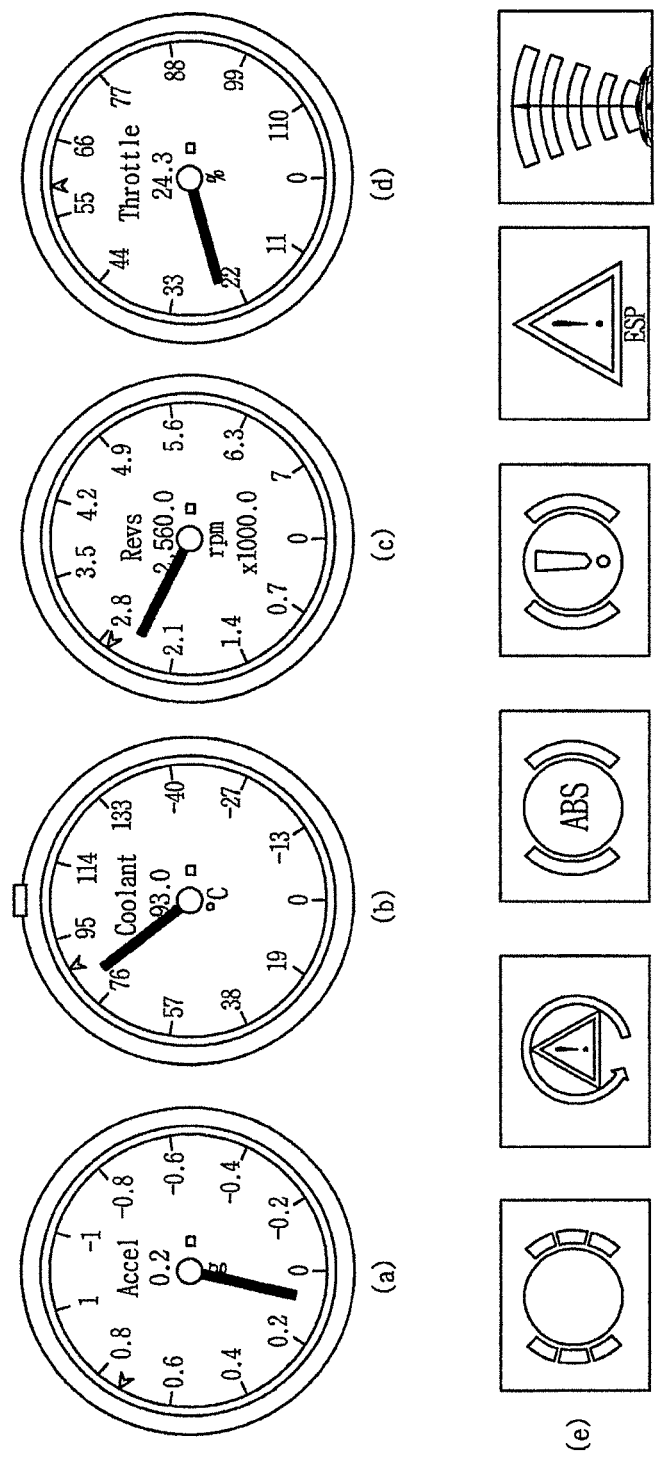
Figure 6E:
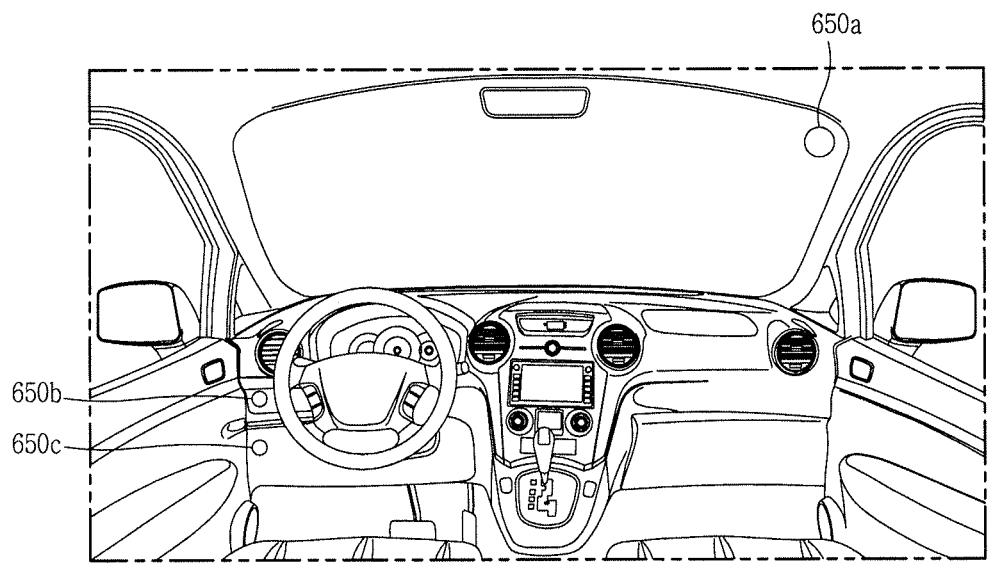

Referring to FIGS. 6D(a)~(d), the information about the inside of the vehicle can include acceleration information, coolant information, engine rpm information, fuel information, etc. As shown in FIG. 6E, the information about the vehicle, displayed on the display unit 370 of the second body 520, can include brake pad warning information, washer liquid/air pressure warning information, Anti-lock Brake System (ABS) warning information, hand brake warning information, Electronic Stability Program (ESP) warning information, information indicating a probability of collision, etc.

That is, as aforementioned with reference to FIGS. 6C and 6D, the processor 382 of the second body 520 can sense a state of the vehicle by being mounted to one module of the vehicle 600, and can control the display unit 370 to output different screen information according to the sensed state of the vehicle. That is, different screen information can be output to the display unit 370 of the second body 520 according to a state of the vehicle 600. The processor 382 of the second body 520 can change information about the vehicle being output to the display unit 370, as a preset type of touch (e.g., a short touch, a long touch, a drag touch, a swipe touch, a flick touch, etc.) is applied to the display unit 370.

When the first body 510 is disposed within a predetermined distance from the second body 520 (e.g., a user who has worn the first body 510 drives the vehicle or is riding the vehicle together), even if the second body 520 is provided in the vehicle, the controller 180 of the first body 510 can continuously sense a state of the user using the sensing unit 140 of the first body 510.

Then, if the state of the user corresponds to a preset state (e.g., a case where a fatigue value is more than a predetermined value, or an emergency situation (e.g., a heart attack), the controller 180 of the first body 510 can control the second body 520 to execute a function related to the preset state. The second body 520 can execute the function and output information about the function to the display unit 370, based on a control command of the first body 510.

If a mounting position of the second body 520 to the vehicle 600 is changed, the processor 382 can control a display unit of the second body 520 to change the information about the vehicle. For instance, if the second body 520 is mounted to a first position of the vehicle 600 (e.g., a cluster), the processor 382 can display information about the first position (e.g., speed information, RPM information, fuel information, vehicle warning information, etc.). On the contrary, if the second body 520 is mounted to a second position of the vehicle 600 (e.g., a CID display), the processor 382 can display information about the second position (e.g., information which can be output from a navigation such as navigation information, photos and videos).

The second body 520 can be provided with the sensing unit 140 of FIG. 1A.

The processor 382 can sense different data based on a mounting position of the second body 520 to the vehicle 600. For instance, as shown in FIG. 6E, the vehicle 600 can be provided with at least one of first to third positions 650a, 650b, 650c where the second body 520 is mountable. For instance, if the second body 520 separated from the first body 510 of the watch-type mobile terminal 200 is mounted to the first position 650a of the vehicle (e.g., a wind shield), the processor 382 can control the sensing unit 140 to sense first information (e.g., weather information, information about a peripheral brightness, information about an object near the vehicle, etc.).

As another example, if the second body 520 is mounted to the second position 650b of the vehicle (e.g., a region near a cluster), the processor 382 can control the sensing unit 140 to sense second information different from the first information (e.g., information about driving of the vehicle such as a vehicle speed and a refueling amount).

As another example, if the second body 520 is mounted to the third position 650c of the vehicle (e.g., a region near a brake pedal), the processor 382 can control the sensing unit 140 to sense third information different from the first and second information (e.g., an engine RPM, information about a braking power). With such a configuration, in the present invention, since the second body separated from the first body of the watch-type mobile terminal is mounted to various positions of the vehicle, information about the vehicle can be sensed in an optimum manner, and functions of the vehicle can be controlled.

Hereinafter, various embodiments to mount the second body separated from the first body to the watch-type mobile terminal of the present invention will be explained in more detail.

The second body 520 may be separated from the first body 510 to thus be attached to the mobile terminal of FIG. 1B. In this instance, the processor 382 can provide different control rights according to whether an external device (mobile terminal) to which the second body 520 has been mounted is a pre-authorized device.

The different control rights can be a control right to control the external device (mobile terminal) to which the second body 520 has been mounted, or a control right to control the vehicle by the external device (mobile terminal) to which the second body 520 has been mounted.

For instance, if the external device to which the second body 520 has been mounted is a pre-authorized device, the processor 382 can set a first control right. On the contrary, if the external device to which the second body 520 has been mounted is not a pre-authorized device, the processor 382 can set a second control right that has a lower control level than the first control right.

The external device to which the second body 520 has been mounted can be a pre-authorized device, when the second body 520 has ever been mounted to the external device, when mounting the second body 520 to the external device is pre-authenticated before the second body 520 is separated from the first body, and when the second body 520 undergoes a user authentication after being attached to the external device.

As another example, when the external device to which the second body 520 has been mounted is a first mounting external device, the processor 382 can determine the external device as a non-authorized device. The external device to which the second body 520 has been mounted can control the vehicle controllable by the FOB module 380 of the second body 520. For instance, a user interface related to a control of the vehicle can be output to a display unit of the external device. Then, the vehicle can be controlled based on a touch (or a user input) applied to the display unit of the external device.

In this instance, a control degree of the vehicle (a control right) can be changed according to whether an external device (mobile terminal) to which the second body 520 has been mounted is a pre-authorized device. For instance, if the external device (mobile terminal) to which the second body 520 has been mounted is a pre-authorized device, the processor 382 can provide the external device with a first control right to execute all functions of the vehicle.

As another example, if the external device (mobile terminal) to which the second body 520 has been mounted is not a pre-authorized device, the processor 382 may display information requiring authentication on the display unit 370 (or the display unit of the external device), or can provide the external device with a second control right to execute only a predetermined function of the vehicle.

If it is determined that the external device (mobile terminal) to which the second body 520 has been mounted is a specific device (e.g., a thief's mobile terminal), the processor 382 of the second body can transmit warning information to the first body or a preset external device (e.g., an owner's mobile terminal pre-authenticated with the watch-type mobile terminal, or a server provided at a police station). Once a mounted state of the second body to an external device is sensed, information about the external device can be transmitted to the first body or a pre-authenticated mobile terminal.

In a situation where the second body is mounted to the external device, a control right for controlling the vehicle by the external device can be classified as follows.

For instance, if the external device is a mobile terminal of a third party (e.g., a designated driver), settings other than those for driving may not be changed, and a position of the vehicle and the second body can be traced. In this instance, a control right of a first level, which indicates a driving distance, can be provided to the second body 520 (or the external device). As another example, if the external device is a mobile terminal of a teenager (e.g., a child), a control right of a second level, which restricts a highest driving speed and indicates a driving distance, can be set to the second body 520.

As another example, if the external device is a mobile terminal of a parent, a control right of a third level, which indicates a safety-related setting (e.g., activating an inactivated ADAS function, and controlling a sensitivity of an air bag) and automatically transmits a signal for help when an emergency situation occurs, can be set to the second body 520. As another example, if the external device is a mobile terminal of a spouse, a control right of a fourth level, which executes a setting customized to the spouse, can be set to the second body 520.

When the second body 520 is separated from the first body 510, the watch-type mobile terminal 200 of the present invention can execute various determinations. For instance, if the second body 520 is separated from the first body 510, the controller 180 of the first body (or the processor 382 of the second body) can set a device to be controlled, a control right, etc.

Then, once the second body 520 is separated from the first body 510, the second body 520 can request an additional authentication from another party. For instance, authentication request information (One Time Password (OTP), mounting to a pre-authenticated external device, or a user authentication (fingerprint recognition)) can be output to the second body 520, and the additional authentication can be executed through another party's response. Then, the second body 520 can control the vehicle with a control right set in a connected state between the first and second bodies 510, 520.

When the second body 520 is separated from the first body 510, the second body 520 can determine a change of a user of the second body. In a situation where the second body 520 is separated from the first body 510, the second body 520 can set a priority to a control right of the smart key of the vehicle, and a control right of the second body 520.

The second body 520 can be coupled to the first body owned by another person. In this instance, the second body 520 can authenticate said another person through a password of a preset pattern, a fingerprint recognition, an NFC, etc., and can set different control rights based on the authenticated another person.

If the second body 520 is separated from the first body 510, a position tracing function with respect to the second body 520 can be activated. In this instance, the second body 520 can real-time transmit its position to the first body 510.

If the second body 520 is spaced apart from the first body 510 by more than a preset distance, the second body 520 can transmit notification information to the first body 510 (or a specific server such as a server of a security company). In this instance, the notification information can be output to the first and second bodies 510, 520, and the output of the notification information can be stopped when a user's authentication through the second body 520 is executed.

If the second body 520 is spaced apart from the first body 510 by more than a preset distance, the first body 510 can cancel the control right set to the second body 520. In this instance, the vehicle controlled by the control right of the second body 520 can be stopped within a predetermined distance (or an area where the vehicle can stop), can move to a preset place (a police station, a rest area, etc.), or can autonomously move to a place where the first body is positioned.

As aforementioned, the second body 520 can include the FOB module 380 for controlling an external device, and the display unit 370 formed to be detachably mounted to the FOB module 380. The display unit 370 can be provided with a processor for controlling an external device. Accordingly, it is possible for the display unit 370 to control an external device.

A control right of the display unit 370 can be changed according to a connected state of the display unit 370 to the FOB module 380. For instance, if the display unit 370 and the FOB module 380 are connected to each other, a first control right to execute all functions of the vehicle can be set to the display unit 370.

As another example, if the display unit 370 is separated from the FOB module 380, a second control right to execute only a predetermined function of the vehicle can be set to the display unit 370. In this instance, the FOB module 380 can be set to have the first control right.

As aforementioned, each of the FOB module 380 and the display unit 370 can be provided with a communication unit for reciprocal communication. For instance, if the display unit 370 is separated from the FOB module 380, the processor of the FOB module 380 (or the processor of the second body) can control the display unit 370 based on an input applied to the FOB module 380.

For instance, the FOB module 380 can be provided with an input/output unit (e.g., at least one of a display module and a user button). The control right set to the display unit 370 can be changed to a higher or lower control right or may disappear, based on a user input applied through the input/output unit of the FOB module 380.

The input/output unit of the FOB module 380 can be activated when the display unit 370 is separated from the FOB module 380. The activated input/output unit may be deactivated when a predetermined time lapses or when the display unit 370 is mounted to the FOB module 380.

Likewise, the main system 310 of the first body can be provided with an input/output unit. The control right provided to the second body (the FOB module 380 or the display unit 370) can be changed based on a user input applied through the input/output unit provided at the main system 310 of the first body.

The input/output unit of the main system 310 can be activated when the second body is separated from the first body. The activated input/output unit can be deactivated when a predetermined time lapses or when the display unit 370 is mounted to the FOB module 380.

Figure 7:
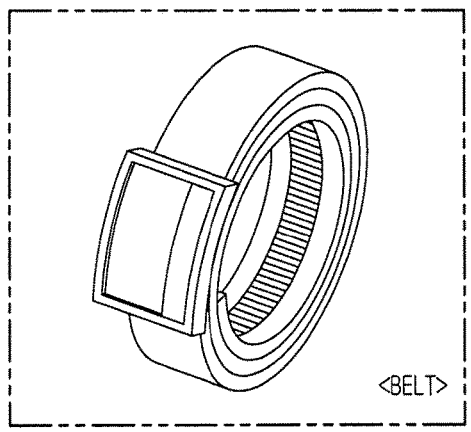
FIG. 7 is a conceptual view illustrating various types of detachable mobile terminals according to an embodiment of the present invention.
Figure 7:
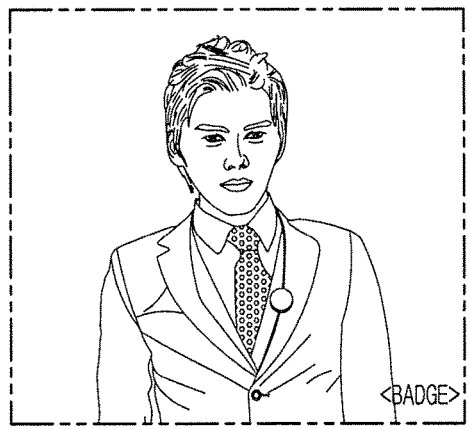
Figure 7:
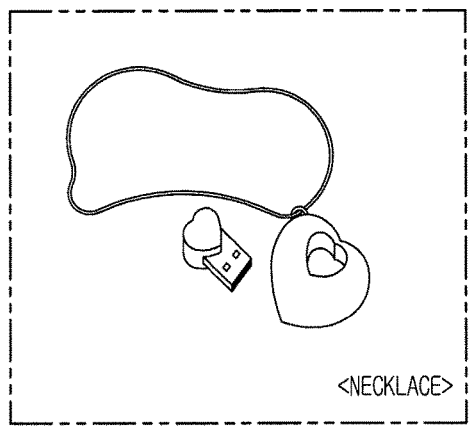
Figure 7:
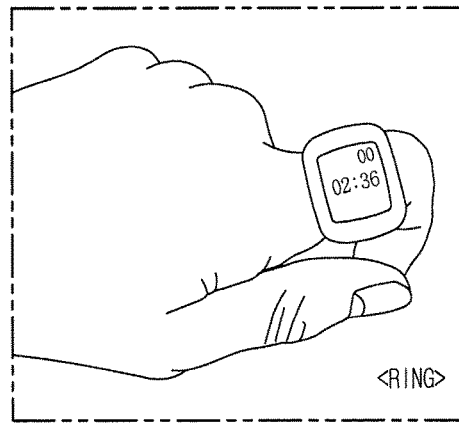
Figure 7:
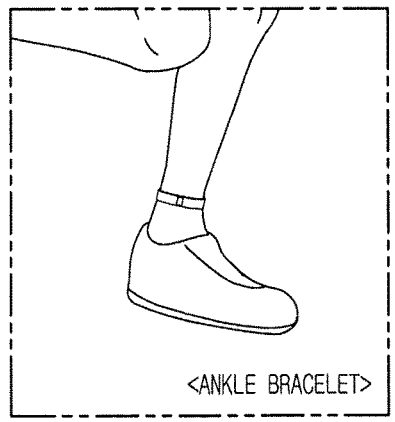

The watch-type mobile terminal of the present invention is not limited to a watch type. That is, as shown in FIG. 7, the watch-type mobile terminal of the present invention, which includes the first and second bodies formed to be separable from each other may be implemented in various forms such as a belt, a necklace, a ring, a badge and an ankle bracelet.

In the present invention, when the second body is separated from the first body, a control right to control an external device can be differently set. With such a configuration, the present invention can provide a detachable mobile terminal capable of controlling an external device in an optimum manner.

Further, the present invention can provide a user interface capable of using an external device more conveniently and safely by setting different control rights, based on a type of the external device to which the second body separated from the first body is mounted, based on a mounting position inside the external device, and according to whether the external device is a pre-authenticated device or not, etc.

The present invention can be implemented as computer-readable codes in a program-recorded medium. The computer-readable medium can include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium can also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal for controlling a vehicle, comprising:
a wearable wrist band;
a first body connected to the wearable wrist band;
a second body including an input unit and configured to be detachably mounted to the first body; and
a controller in the second body and configured to:
execute a first function based on the second body being attached to the first body, and
execute a second function based on the second body being separated from the first body,
wherein when the second body is separated from the first body and attached to an external device, the controller in the second body is further configured to execute a different function based on a type of the external device,
wherein when the external device to which the second body is attached is a first device, the controller in the second body executes a function related to the first device, and when the external device to which the second body is attached is a second device different from the first device, the controller in the second body executes a function related to the second device,
wherein the second body includes a FOB body and a display configured to be detachably mounted to the FOB body, the FOB body includes an input/output unit,
wherein when the second body is attached to the external device, the controller in the second body senses a state of the external device and controls the display to display different screen information based on the sensed state of the external device, and
wherein the input/output unit of the FOB body is activated when the display is separated from the FOB body, and a control right set to the display is changed based on a user input applied through the input/output unit of the FOB body.

2. The mobile terminal of claim 1, wherein the first function includes a sleep control function, a time output function, a messaging function, a schedule function, a health tracking function or a pedometer function, and
wherein the second function includes unlocking or locking the vehicle, starting an engine of the vehicle, a memory seat function, a function related to operating the vehicle or a vehicle status display function.

3. The mobile terminal of claim 1, wherein the second function is based on a mounting location of the second body in the vehicle.

4. The mobile terminal of claim 3, wherein the mounting location is a location on a steering column of the vehicle, a center console of the vehicle or a lighter socket of the vehicle.

5. The mobile terminal of claim 1,
wherein the second function is selected among a first set of functions based on the FOB body being separated from the display, and
wherein the second function is selected among a second set of functions based on the display being mounted to the FOB body.

6. The mobile terminal of claim 1, wherein the second body includes a fingerprint sensor for scanning a fingerprint of a user, and
wherein the second function is based on authenticating the user based on the fingerprint.

7. The mobile terminal of claim 1, wherein the second body includes a main system body, a FOB body and a display,
wherein the second function is selected among a first set of functions based on the main system body, the FOB body and the display being mounted together,
wherein the second function is selected among a second set of functions based on the display being mounted to the FOB body and the FOB body being detached from the main system body,
wherein the second function is selected among a third set of functions based on the display being detached from the main system body and the FOB body, and
wherein the second function is selected among a fourth set of functions based on the FOB body being detached from the main system body and the display.

8. The mobile terminal of claim 1, wherein the second function is based on the vehicle being a pre-authenticated vehicle.

9. The mobile terminal of claim 1, wherein the controller in the second body is further configured to transmit vehicle information to a second controller in the first body.

10. The mobile terminal of claim 1, wherein the second function restricts an operation of the vehicle based on based on a mounting location of the second body in the vehicle.

11. The mobile terminal of claim 1,
wherein the second function restricts an operation of the vehicle based on based on the display being separated from the FOB body.

12. The mobile terminal of claim 1, wherein the controller in the second body is further configured to restrict an operation of the vehicle in response to the second body exceeding a predetermined separation distance from the first body.

13. A method of controlling a mobile terminal, the method comprising:
executing a first function based on a second body being attached to a first body connected to a wearable wrist band; and
executing a second function related to a vehicle based on a second body being separating from the first body,
wherein the first function includes a sleep control function, a time output function, a messaging function, a schedule function, a health tracking function or a pedometer function, and
wherein the second function includes unlocking or locking the vehicle, starting an engine of the vehicle, a memory seat function, a function related to operating the vehicle or a vehicle status display function,
wherein the method further comprises:
when the second body is separated from the first body and attached to an external device, executing a different function based on a type of the external device,
when the external device to which the second body is attached is a first device, executing a function related to the first device, and
when the external device to which the second body is attached is a second device different from the first device, executing a function related to the second device,
wherein the second body includes a FOB body and a display configured to be detachably mounted to the FOB body, the FOB body includes an input/output unit,
wherein the method further comprises:
when the second body is attached to the external device, sensing a state of the external device and displaying different screen information based on the sensed state of the external device, and
wherein the input/output unit of the FOB body is activated when the display is separated from the FOB body, and a control right set to the display is changed based on a user input applied through the input/output unit of the FOB body.

14. The method of claim 13, wherein the second function is based on a mounting location of the second body in the vehicle.

15. The method of claim 14, wherein the mounting location is a location on a steering column of the vehicle, a center console of the vehicle or a lighter socket of the vehicle.

16. The method of claim 13,
wherein the method further comprising:
selecting the second function among a first set of functions based on the FOB body being separated from the display; and
selecting the second function among a second set of functions based on the display being mounted to the FOB body.

17. The method of claim 16, further comprising:
restricting an operation of the vehicle based on the display being separated from the FOB body.

18. The method of claim 13, further comprising:
scanning a fingerprint of a user via a fingerprint scanner in the second body; and
selecting the second function based on authenticating the user based on the fingerprint.

19. The method of claim 13, further comprising:
selecting the second function based on whether the vehicle is a pre-authenticated vehicle.

* * * * *